United States Patent [19]
Murry

[11] 3,825,887
[45] July 23, 1974

[54] ULTRASONIC BAND TRANSMISSION, FOCUSING, MEASURING AND ENCODING SYSTEMS

[75] Inventor: Edward J. Murry, Palos Park, Ill.

[73] Assignee: Fibra-Sonics, Inc., Chicago, Ill.

[22] Filed: Apr. 3, 1972

[21] Appl. No.: 240,577

[52] U.S. Cl. ............................... 340/15, 181/.5 NP
[51] Int. Cl. ........................................... H04b 11/00
[58] Field of Search .................. 350/96 R, 96 WG, 350/96 B; 340/15, 8 L, 8 MM; 128/24 A; 259/DIG. 41, DIG. 44; 181/.5 R, .5 ED; 84/1.04, 1.05, 1.06, 1.14

[56] References Cited
UNITED STATES PATENTS

| | | | |
|---|---|---|---|
| 1,277,562 | 9/1918 | Fessenden | 181/.5 R |
| 1,852,795 | 4/1932 | Wegel | 84/1.06 |
| 2,044,807 | 6/1936 | Noyes, Jr. | 340/8 MM |
| 2,222,057 | 11/1940 | Benioff | 84/DIG. 24 |
| 2,480,131 | 8/1949 | Hammond | 84/1.14 |
| 2,825,260 | 3/1958 | O'Brien | 350/96 B |
| 2,966,089 | 12/1960 | Gercken | 84/1.04 |
| 3,305,689 | 2/1967 | Leavy, Jr. et al. | 350/96 B |
| 3,331,651 | 7/1967 | Sterzer | 350/96 B |
| 3,333,279 | 7/1967 | Colen et al. | 350/96 B |
| 3,556,635 | 1/1971 | Schrenk et al. | 350/96 WG |
| 3,584,327 | 6/1971 | Murry | 128/24 A |
| 3,596,104 | 7/1971 | Macomber | 350/96 WG |
| 3,633,034 | 1/1972 | Uchida | 350/96 WG |
| 3,633,035 | 1/1972 | Uchida | 350/96 WG |
| 3,661,065 | 5/1972 | Yamazaki et al. | 350/96 B X |
| 3,702,275 | 11/1972 | Hooker | 350/96 B X |

OTHER PUBLICATIONS

C. Bruno & Son Inc. Catalog No. 96, pp. 243–245, 460 West 34th St., NYC.

Primary Examiner—Malcolm F. Hubler
Assistant Examiner—T. M. Blum

[57] ABSTRACT

A method and apparatus for transmitting sonic waves of all shapes and durations which utilizes a bundle of fibrous transmitting material which vary in length or material or density or distribution or locations such that the received wave may be selectively shaped and formed to meet a desired criteria.

8 Claims, 15 Drawing Figures

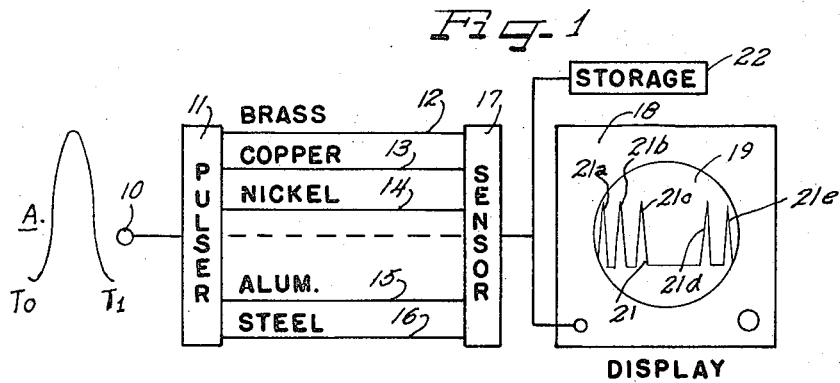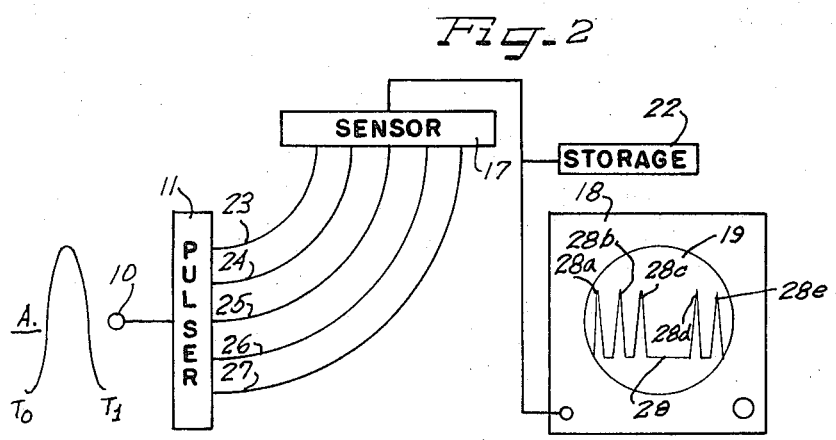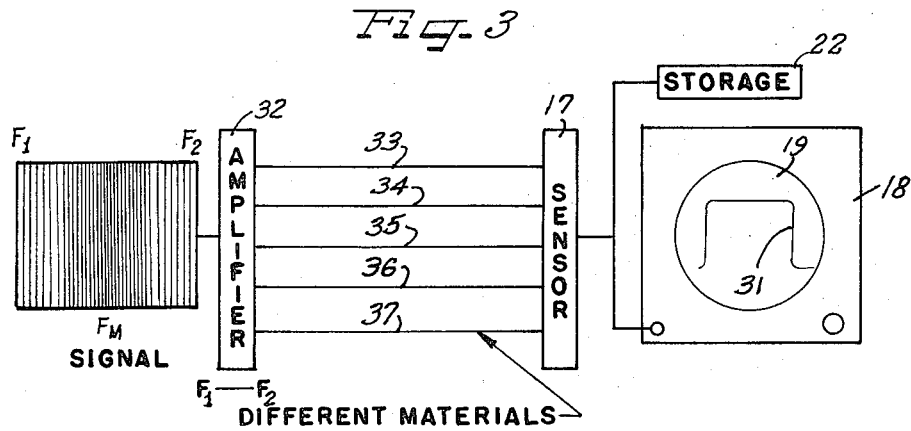

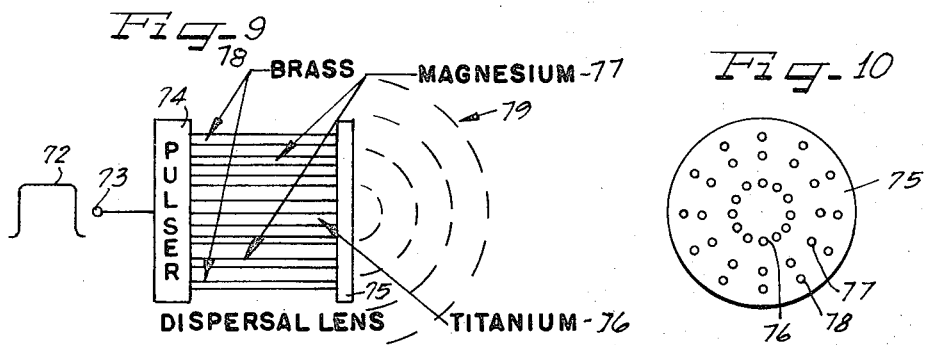
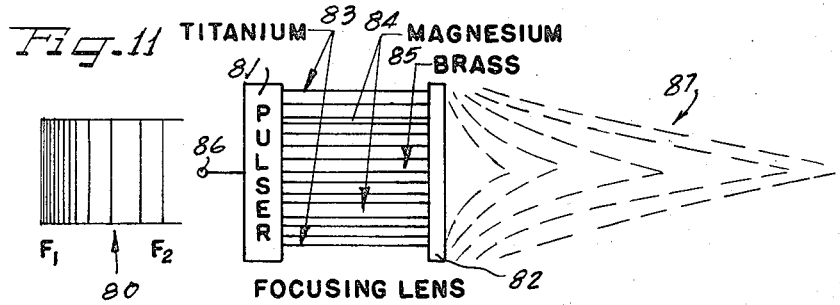
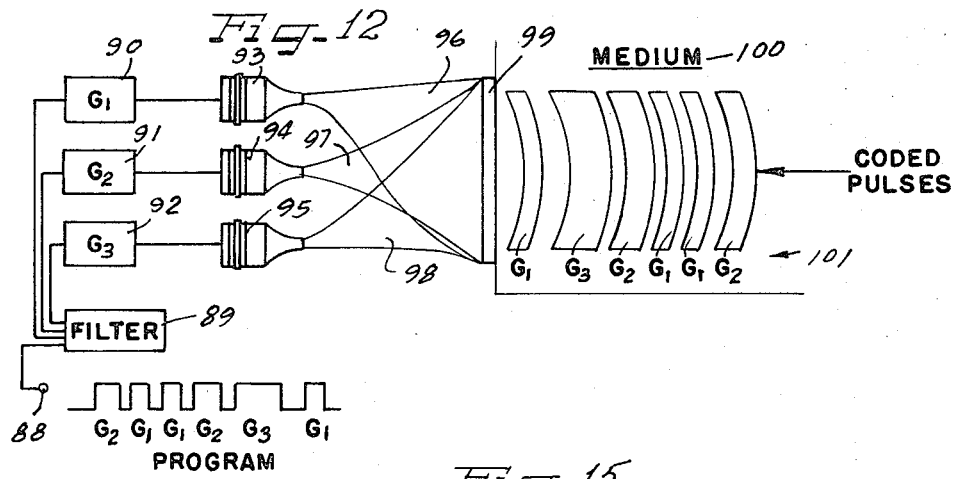
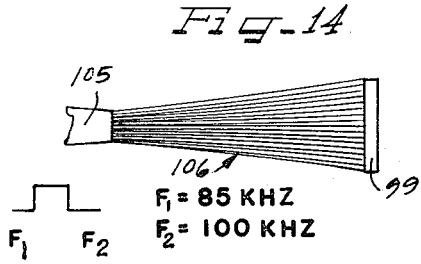
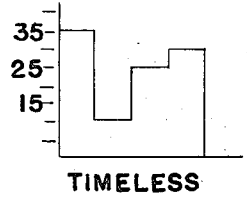
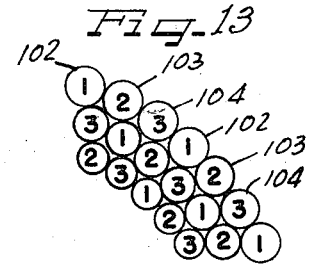

3,825,887

ULTRASONIC BAND TRANSMISSION, FOCUSING, MEASURING AND ENCODING SYSTEMS

CROSS REFERENCE TO RELATED INVENTIONS

This invention is an improvement on my prior U.S. Pat. No. 3,584,327 entitled ULTRASONIC TRANSMISSION SYSTEM.

BACKGROUND OF THE INVENTION

1. Field of the Invention

This invention relates in general to the transmission of ultrasonic energy and in particular to a band transmission system for focusing, measuring and encoding systems.

2. Description of the Prior Art

It has been known in the prior art to utilize a plurality of fibers formed into bundles for transmitting ultrasonic energy. Such fibers have high "Q's" and all of the individual strands of the prior art were of the same material and all the same length and thus behaved as a single wire delay line. Thus, only a narrow band of frequencies could be transmitted with the devices of the prior art.

SUMMARY OF THE INVENTION

The present invention allows energy to be transmitted over a wide frequency range by utilizing fibers of different materials which have different propagation constants and/or utilizing fibers of different lengths so as to compensate for the different velocities of the various frequencies through the fibers. Also, the apparatus and method of shaping an output wave is disclosed wherein the wave may be made to converge or diverge based upon the geographic positioning of the fibers at transmitting and receiving stations coupled with the lengths and materials of the transmitting fibers.

It is an object of the present invention therefore to provide a method of transmitting sonic waves of all shapes and duration such as pulses or shaped waves from one or more sources and to receive them so as to achieve signal processing of any and all types and at all amplitudes.

It is an object of the invention to provide a system for transmitting and combining many types of signals via fibrous wave guides of differing lengths and/or different properties.

A further object of the invention is to provide a method and apparatus for focusing or diverging sonic waves into various media by controlling the transmitted waves in the fibers.

A still further object of the invention is to provide apparatus and method of delivering precisely determined "highpass," "lowpass," or "bandpass" signals of concise quantitative spectral distribution.

A further object of the invention is to provide a method and apparatus for time coding digital signals or for converting analogue signals to digital codes for encoding or decoding time varying signals.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a drawing illustrating the use of different materials of fibers of the same length for transmitting and displaying input signals;

FIG. 2 illustrates the use of fibers of different lengths of the same material for transmitting and displaying signals;

FIG. 3 illustrates the use of fibers of different materials for transmitting a band of frequencies;

FIG. 9 illustrates the use of fibers of different materials for focusing an input wave;

FIG. 10 is an end view of the dispersion lens of FIG. 9;

FIG. 11 illustrates how the point of focus can be varied by the use of a sweeping frequency into the pulser, using an inverse lens of FIG. 9;

FIG. 12 shows how complex encoding and decoding can be accomplished by an input filter which feeds separate generators into a series of pulsers which, in turn, feed a selected set of predetermined fiber waveguides;

FIG. 13 shows how the fibers are uniformly distributed into triads;

FIG. 14 shows how we may select the output power percentage by allocating in advance the frequency responsive fibers; and FIG. 15 shows the output power level when the method in FIG. 14 is used.

DESCRIPTION OF THE PREFERRED EMBODIMENT

Figure 4:
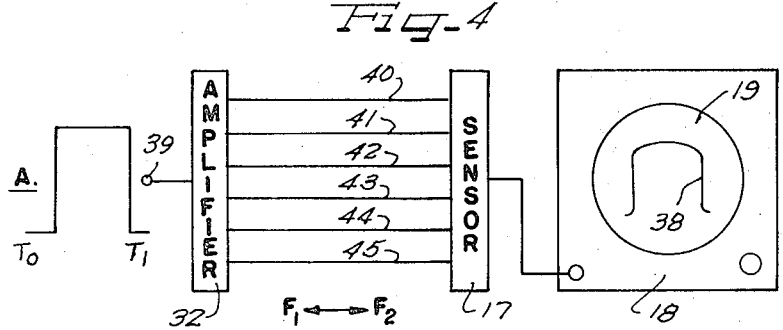
FIG. 4 illustrates transmitting of pulse signals through a band-frequency wave guide.

The basic equation for tuned transmission lines used for transmission of sonic and ultrasonic waves (for a one-quarter wavelength section) is given by the equation:

$$L = 1/4f \sqrt{E/\rho}$$

This equation holds where the diameter of the guide is much less than a single wavelength, which is applicable for fiber wave guides.

Where:
$L$ = Length
$f$ = frequency
$E$ = Young's modulus for material used
$\rho$ = density of material used.

As explained in my U.S. Pat. No. 3,584,327, each wire or fiber behaves as if it were acting alone and is capable of transmitting longitudinal waves only and all that is needed to prove the above equation is to illustrate the ease with which this simple equation can be utilized to derive the results.

The more general equation is given by $$L = \sqrt{V_0 (1 - \sigma^2 \pi^2 a^2)/4f}$$

Where:
 $V$ = Velocity of sound in material
 $\sigma$ = Poisson's ratio for the material used
 $a$ = radius of rod or fiber used
 $f$ = frequency of sound used
 $L$ = length of rod or fiber.

However, as a rod becomes long and thin, in other words, becomes a wire fiber, the second term in parentheses in the numerator approaches zero and the equation becomes $$L = \sqrt{V/4f}$$

for a one-quarter wavelength wave.

In a specific example, if a frequency of 25 kHz is arbitrarily chosen for transmission through a fibrous wave guide made of different materials with the length of the fibrous wave guide being selected as 40 cms. long, we find that each 40 cm. fiber of different materials is able to carry a different number of wave lengths as follows:

| Material | Wavelengths in Fiber | Velocity |
| --- | --- | --- |
| Brass | 2.95 | 3.40 M/Msc |
| Copper | 2.74 | 3.65 M/Msc |
| Nickle | 2.13 | 4.70 M/Msc |
| Magnesium | 2.13 | 4.70 M/Msc |
| Aluminum | 1.95 | 5.15 M/Msc |
| Steel | 1.95 | 5.16 M/Msc |
| Iron | 1.94 | 5.18 M/Msc |
| Titanium | 1.94 | 5.18 M/Msc |

Thus, different arrival times of the nodes and the antinodes of energy must occur if energy of the same frequency is fed to each of the fibers simultaneously and the time of arrival will depend solely upon the material of which the fiber is constructed.

Thus, if a pulse is simultaneously applied to a plurality of fibers of differing materials of the same length the pulse will arrive at the output end of the fiber at different times as illustrated in FIG. 1. The same result could be obtained as illustrated in FIG. 2 where separate fibers of the same material are utilized but are made of differing length, then the pulse at the output will also occur at different times.

In FIG. 1 a pulse A is applied to terminal 10 which supplies an input to a pulser 11 which is attached to a plurality of fibers of different materials that have different velocities of sound in the material. The fibers are designated by numerals 12–16 and fiber 12 might be of brass, fiber 13 of copper, fiber 14 of nickel, fiber 15 of aluminum and fiber 16 of steel. A sensor 17 at the receiving end is connected to the other end of the fibers 12–16 and supplies an output to an oscilloscope 18 which has a cathode ray tube 19 upon which a trace 21 is produced. A storage means 22 also receives the output of the sensor 17 to produce a stored record of the transmitted pulse A. It is to be noted that the trace 21 comprises a plurality of pulses 21a–21e, separated on a time scale which corresponds to the transmission time of the pulse A through the fibers 12–16. In other words, the first pulse 21a arrived through the steel fiber since steel has the highest velocity of the materials utilized in the example. The pulse 21b arrived through the aluminum fiber. The pulse 21c arrived through the nickel fiber 14. The pulse 21d arrived through the copper fiber 13 and the pulse 21e arrived through the brass fiber 12.

In the apparatus of FIG. 2, the pulse A is applied to terminal 10 which is connected to the pulser 11 and a plurality of fibers 23–27 of the same material but of different lengths are connected between the input pulser and an output sensor 17. Sensor 17 is connected to the oscilloscope 18 and a storage means 22 as in FIG. 1. Due to the varying lengths of the fibers 23–27, the pulse A will appear on the trace 28 of the oscilloscope as a plurality of pulses 28a–28e, as shown. Pulse 28a will pass through the fiber 23 of shortest length; pulse 28b will pass through the fiber 24 of the next greater length; etc.

FIG. 3 illustrates apparatus for transmitting a band of frequencies of specific distribution which vary between frequency of F1 and F2 which are applied to a broadband amplifier 32 which is connected to a plurality of fibers 33–37 which have the same length but are made of different materials and which are connected to a sensor 17 which is connected to the oscilloscope 18 and the storage device 22. The trace 31 of the oscilloscope comprises a band of frequencies as desired.

FIG. 4 illustrates a square wave pulse A of the shape shown which is applied to the input terminal 39 of the amplifier 32 which supplies input to bandpass fiber waveguide 40–45 which has its opposite ends connected to the sensor 17. Sensor 17 is connected to the oscilloscope 18 and produces a trace 38.

Figure 5:
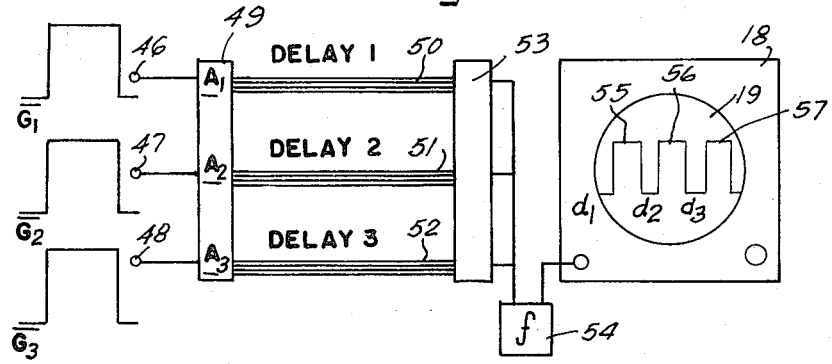
FIG. 5 illustrates feeding a single pulse into three amplifiers feeding a series of delay lines of different materials or lengths for display as separate signals.

FIG. 5 illustrates a number of input terminals (46, 47 and 48) which are all connected to pulser 49, separate input pulser of G1, G2 and G3 (not shown). The output wave from pulser 49 travels through a series of frequency selective fibers (50, 51 and 52) which are all essentially interwoven as in FIG. 6, except that they are uniformly distributed over the rear face of sensor 53 in a more or less random manner, assuring only their numerical equality. The entire outputs of sensor 53 then pass through integrator 54 and are applied to oscilloscope 18 to produce traces 55, 56 and 57.

FIGS. 6, 7, 8, 9, 10 and 11 disclose means for focusing a beam so that it either converges or diverges.

Figure 6:
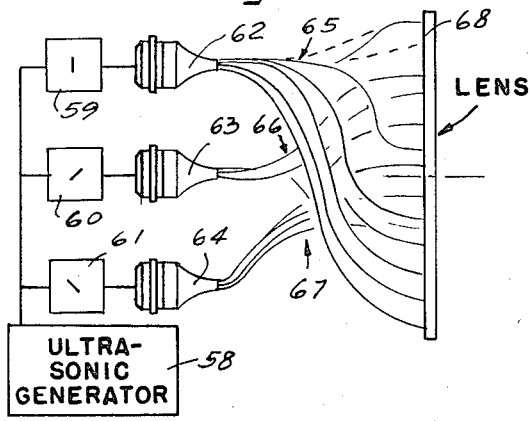
FIG. 6 illustrates a focusing arrangement by geographically arranging the placement of fibers over which pulses are transmitted.
Figure 7:
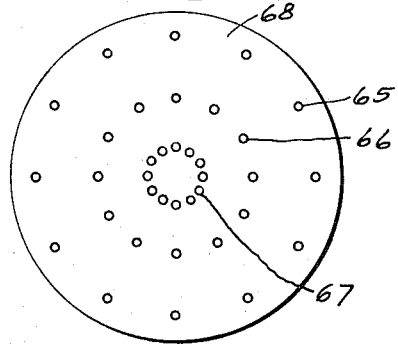
FIG. 7 is an end plan view of the lens of FIG. 6.
Figure 8:
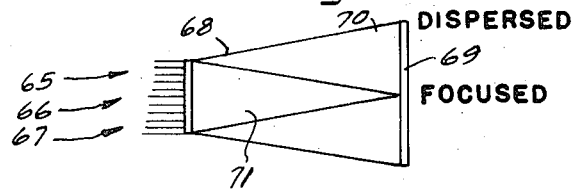
FIG. 8 is a side view of the lens of FIG. 6 showing how focusing or dispersal can be accomplished.

FIGS. 6, 7 and 8 illustrate a first embodiment wherein an ultrasonic generator 58 is connected to amplifiers 59, 60 and 61 which have adjustable gains and which are connected to ultrasonic motors 62, 63 and 64, respectively. Fiber bundle 65 is connected to the motor 62 and the fibers are made of the same material and have the same lengths and are connected to a lens 68 about its periphery as best shown in FIG. 7. Fiber bundle 66 is connected to the motor 63, the fibers of bundle 66 being of material different from that of bundle 65 and the other end of the bundle 66 fibers are connected to the lens 68 in a middle-disposed circular manner as shown in FIG. 7 such that they are inside the circle formed of the fibers of bundle.

The motor 64 is connected to fiber bundle 67 which is connected, as shown in FIG. 7, to the lens 68 to form a central circle internal to the ends of fibers 66. If the velocity through the fibers 66 and 65 and the velocity through the fibers 66 is faster than that of the fibers 67, assuming that the length of the fibers is the same, the beam caused by the energy from the ultrasonic generator 58 will be focused as shown by the focused beam 71 on the target surface. On the other hand, if the fibers 65 have a faster sonic and ultrasonic energy transmission characteristic than the fibers 66 and 67, and the fibers 66 have a faster energy transmission characteristic than the fibers 67, the beam will be dispersed over the target surface as shown by beam 70 in FIG. 8.

FIGS. 9 and 10 illustrate a pulse 72 which is applied to a terminal 73 connected to a pulser 74 which is connected to a fixed dispersal lens 75 by a plurality of fibers of different materials 76, 77 and 78. A disc-shaped lens 75 is connected to the other ends of the fibers 76, 77 and 78. The fibers 76 at the center of the lens might be made of titanium which have a faster velocity than the fibers 77 and 78. The fibers 77 might be formed in a circle about the fibers 76 and might be made of magnesium, for example. The fibers 78 are placed about the outer periphery of the lens 75 and might be made of brass, for example. This arrangement provides the unfocused beam 79 as illustrated.

FIG. 11 illustrates an input terminal 86 to which a frequency varied signal 80 is applied which varies from the frequency of F1 to F2. The pulser 81 is connected to a lens 82 by a plurality of fibers 83, 84 and 85 of different materials and arranged in concentric circles on the lens 82. The outer fibers 83 might now be of titanium which have a faster velocity than the fibers 84 and 85. The fibers 84 might be made of magnesium and might be formed on the lens 82 in a circle inside the fibers 83. The fibers 85 may be made of brass which has a slower velocity than the magnesium fibers and they may be arranged on the lens 82 inside of the fibers 84. As the frequency of the input signal varies from F1 to F2, the beam 87 will be caused to sweep its focus point longitudinally as shown in the figure.

FIGS. 12, 13, 14 and 15 illustrate apparatus for obtaining a specific frequency versus power distribution and selective activation of the actual media into which the sonic energy is placed and is accomplished by arranging transmitting fibers which have diverse response in a properly ordered manner so as to achieve an ordered distribution of the energy output. The fibers may be actuated in accordance with a predetermined program and this allows transmitted coded pulses to be transmitted into the medium, as for example water or metal, that can be coded, detected and decoded.

Input terminal 88 is connected to a multiple filter 89 which separates input program designated as G1, G2 and G3, respectively, supplies G1 amplifier 90, G2 amplifier 91 and G3 amplifier 92 with the respective pulses. Motor 93 receives the output of element 90 and applies it to a plurality of fibers 96 which are uniformly connected to a lens 99. A second motor 94 receives the output of element 91 and also applies it to a plurality of fibers 97 connected uniformly to lens 99. A motor 95 is connected to the element 92 and also applies input to fibers 98 which are uniformly mounted on the lens 99.

As shown in FIG. 13, the fibers 96, 97 and 98 are uniformly but evenly dispersed on the lens 99 as shown in a triad in this case.

The lens 99 supplies energy into a medium 100 that might be water or metal in the form of the coded pulses 101 as shown. These pulses are detectable and allow the intelligence in the coded transmitted program to be detected. An ultrasonic probe may be mounted in the medium 100 and connected to an ultrasonic receiver so as to detect the coded pulses 101.

FIG. 14 illustrates a transmitter 105 connected to a plurality of fibers 106 connected to a lens 99 and with the fibers 106 having varying velocity characteristics so as to achieve the predetermined distribution of the energy output desired.

FIG. 15 illustrates this timeless distribution of the preselected band of frequencies chosen. Any pulse of energy which contains the frequencies from 85 to 100 kHz would be transmitted through a fibrous bundle system as constructed in FIG. 14 in the manner shown.

Thus it is seen that the invention utilizes the various possibilities of a system of simple fibers for various selective controls such as:

1. Variation in the length of the fiber;
2. Variation in the material density (hence the acoustic impedance) of the fibers;
3. Variation of the spatial distribution of the fibers;
4. Variation of the input wave activation of the signal pulses;
5. Variation of the input power level to selective groups of the fibers; and
6. Variation of the time ordering of the input power to the fibers.

Thus, by utilizing the above six factors simultaneously or selectively, an almost infinite variety of features and results may be obtained.

The invention may be used for the fabrication of sonic lens of any and all configurations. Also variable reflectors of various types which may be focused or defocused are obtainable. The invention may also be used as a band pass, low pass or high pass filter so as to obtain any desirable frequency transmission characteristics. The invention may be used for encoding or decoding messages. The invention may also be used for non-destructive testing wherein a large input signal may be injected into a workpiece and selectively "pinged" at various frequencies to detect flaws or basic characteristics in or of a material being tested.

Variable length loads may be activated so as to change the frequency of input power as the load length is changed to assure continued activation of the load, as for example, in gas compressive processing or in metallurgical melts.

The amplitude of frequency distribution may be preselected, shown in FIGS. 14 and 15, as desired, in that transmissivity is inherent in the prechoice of the fibers, as as to allow a specified final spectral distribution to the load or activated member. For example, if it is desired to have a 35 percent distribution of 85 kHz energy, a 10 percent distribution of 90 kHz energy, a 25 percent distribution of 95 kHz energy and a 30 percent distribution of 100 kHz waves, then the proper spatial distribution for these frequencies of the fibers may be selected in advance and the length of the wave guide in one-quarter wave length multiples and the total power desired to be transmitted may be determined. While this is only a partial function of the type of material used, the minimum diameter of the composite bundle can nevertheless be determined. Then, if 35 percent of frequency F1, 10 percent of frequency F2, 25 percent of frequency F3, and 30 percent of frequency F4 of the total amount of the fibers are selected this will automatically determine the power distribution. The power, of course, will have to be calculated in the correct power units.

Although this invention has been described with respect to preferred embodiments, it is not to be so limited as changes and modifications may be made therein

I claim:

1. A lens arrangement for focusing and defocusing sonic and ultrasonic energy transmitted between sonic and ultrasonic transmitting and receiving stations comprising a plurality of ultrasonic and sonic fibers connected between said transmitting and receiving stations and each fiber being simultaneously end driven by the same transducer at one end and connected to simultaneously end drive a receiving transducer at the other end, and said plurality of ultrasonic and sonic fibers formed of first and second groups which are each formed of different materials which have different sonic and ultrasonic energy transmitting characteristics, said groups being geometrically arranged to provide said focusing and defocusing action.

2. A lens arrangement for transmitting sonic and ultrasonic energy between stations according to claim 1 wherein said first group of said fibers differ in density from said second group of fibers.

3. A lens arrangement for transmitting sonic and ultrasonic energy between stations according to claim 1 wherein said receiving station includes a sonic and ultrasonic receiving member to which said plurality of fibers are connected.

4. A lens arrangement for transmitting sonic and ultrasonic energy between stations according to claim 3 wherein sonic and ultrasonic receiving lens arrangement is a flat plate to which the ends of said fibers are affixed.

5. A lens arrangement for transmitting sonic and ultrasonic energy between stations according to claim 4 wherein said ends of first group of fibers are affixed to said plate at positions further from the center of said plate than the position through which the ends of said second group of fibers are affixed.

6. A lens arrangement for transmitting sonic and ultrasonic energy between stations according to claim 5 wherein said ends of said first group of fibers are fastened generally in a circle and said ends of said second group of fibers are generally fastened within said circle.

7. A lens arrangement for transmitting sonic and ultrasonic energy between stations according to claim 4 wherein the ends of said first group and second group of fibers are uniformly mounted to said flat plate.

8. A lens arrangement for transmitting sonic and ultrasonic energy between stations according to claim 6, including a sonic and ultrasonic amplifier connected to said first group of fibers.

* * * * *